United States Patent [19]
Kato et al.

[11] Patent Number: 5,246,509
[45] Date of Patent: Sep. 21, 1993

[54] COPPER BASE ALLOY SUPERIOR IN RESISTANCES TO SEIZURE, WEAR AND CORROSION SUITABLE FOR USE AS MATERIAL OF SLIDING MEMBER

[75] Inventors: Tohru Kato, Seto; Tadashi Tanaka, Konan; Masaaki Sakamoto, Nagoya; Koichi Yamamoto, Komaki, all of Japan

[73] Assignee: Daido Metal Company Ltd., Nagoya, Japan

[21] Appl. No.: 917,668

[22] Filed: Jul. 21, 1992

Related U.S. Application Data

[63] Continuation-in-part of Ser. No. 644,044, Jan. 22, 1991, abandoned.

[30] Foreign Application Priority Data

Jan. 22, 1990 [JP] Japan ................... 2-010556

[51] Int. Cl.$^5$ ............................ C22C 9/04; C22C 9/08
[52] U.S. Cl. .................... 148/434; 420/479; 420/480; 420/481; 420/482; 420/490; 420/491; 384/912
[58] Field of Search ................. 420/479–482, 420/490, 491, 493; 148/434; 384/912

[56] References Cited

FOREIGN PATENT DOCUMENTS

| 198959 | 1/1958 | Austria . |
| 53-5973 | 2/1978 | Japan .................... 420/493 |
| 53-44135 | 11/1978 | Japan . |
| 56-11735 | 3/1981 | Japan . |
| 57-70247 | 4/1982 | Japan .................... 420/479 |

Primary Examiner—George Wyszomierski
Attorney, Agent, or Firm—Browdy and Neimark

[57] ABSTRACT

A copper base alloy suitable for use as a material of a sliding member, superior in seizure resistance, wear resistance and corrosion resistance. The alloy comprises 1.0 to 3.5 wt % Mn, 0.3 to 1.5 wt % Si, 11.5 to 25 wt % Zn, 5 to 18 wt % Pb and the balance substantially Cu and incidental impurities, the lead being uniformly distributed through the structure of the alloy. The alloy has a microstructure of which matrix is composed of α-phase alone. The alloy can further contain at least one selected from the group consisting of 0.02 to 1.5 wt % Mg and 0.1 to 1.5 wt % Te and/or at least one selected from the group consisting of 0.5 to 3.0 wt % Ni and 0.3 to 3.0 wt % Al.

5 Claims, 4 Drawing Sheets

*1: MARKS ○ INDICATE THAT NO SEIZURE WAS OBSERVER
MARKS ▨ INDICATE VARYING RANGES OF TEST RESULTS
*2: SAMPLE NO 1 TO 9 ARE ALLOYS OF INVENTION
SAMPLE NO 10 TO 13 ARE CONVENTIONAL ALLOYS

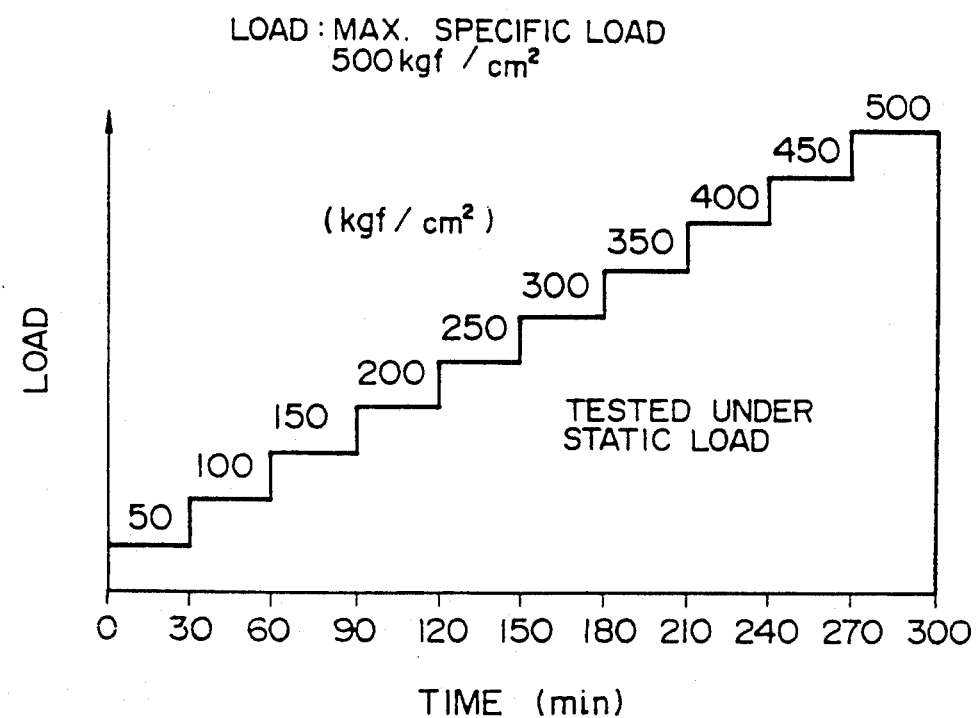
F I G. 1

*1: MARKS ○ INDICATE THAT NO SEIZURE WAS OBSERVER
   MARKS ▨ INDICATE VARYING RANGES OF TEST RESULTS
*2: SAMPLE NO 1 TO 9 ARE ALLOYS OF INVENTION
    SAMPLE NO 10 TO 13 ARE CONVENTIONAL ALLOYS

FIG. 4

| SAMPLE NO | SURFACE DISCOLORATION | RESULTS OF CORROSION TEST CORROSION AMOUNT (mg/cm³) | UPPER BAR: 500HR LOWER BAR: 1000HR |
|---|---|---|---|
| 1 | LIGHT BLACK | 0.02 500HR. TEST<br>0.03 1000HR. TEST | |
| 3 | LIGHT BLACK | 0.02 500HR. TEST<br>0.02 1000HR. TEST | |
| 5 | NO DISCOLORATION | 0 500HR. TEST<br>0.01 1000HR. TEST | |
| 9 | NO DISCOLORATION | 0 500HR. TEST<br>0.01 1000HR. TEST | |
| 10 | LIGHT BLACK | 0.03 500HR. TEST<br>0.05 1000HR. TEST | |
| 11 | BLACK | 0.41 500HR. TEST | 3.40 1000HR. TEST |
| 12 | LIGHT BLACK | 0.03 500HR. TEST<br>0.05 1000HR. TEST | |

SAMPLE NO 1 TO 9 ARE ALLOYS OF INVENTION
SAMPLE NO 10 TO 13 ARE CONVENTIONAL ALLOYS

COPPER BASE ALLOY SUPERIOR IN RESISTANCES TO SEIZURE, WEAR AND CORROSION SUITABLE FOR USE AS MATERIAL OF SLIDING MEMBER

This application is a continuation-in-part of application Ser. No. 07/644,044 filed Jan. 22, 1991, now abandoned.

BACKGROUND OF THE INVENTION

The present invention relates to a copper base alloy which is superior in resistances to seizure, wear and corrosion, suitable for use as a material of a sliding member, particularly, sliding members which are used under severe sliding conditions such as a floating bush bearing of a turbocharger.

In general, the following materials (1) to (3) are known as materials for a floating bush bearing of a turbocharger: (1) a free cutting brass (JIS H3250), (2) a lead-bronze (JIS H5115) and (3) a low-friction high-tension brass which is disclosed in JP-B2-53-44135 and JP-B2-56-11735 of earlier patents of the same applicant.

However, the above-mentioned alloy (1) is inferior in resistances to seizure and wear when used under a boundary lubricating condition, and the alloy (2) can not provide sufficiently high resistance to corrosion when used in deteriorated lubricating oil at high temperature. The alloy (3) could not exhibit satisfactorily high resistance to seizure because of difficulty in enhancing its lead content due to the fact that this alloy has a micro-structure of which matrix is composed of a mixture of $\alpha$- and $\beta$-phases or $\beta$-phase alone.

In recent years, there is a remarkable trend for supercharged engines, and floating bush bearings which are used in turbochargers attached to internal combustion engines are required to operate under more severe conditions such as ambient temperature of the environment, rate of supply of the lubricating oil and degradation of lubrication oil.

In general, a floating bush bearing is heated to a high temperature, e.g., 400° C. or so, due to transfer of heat from a turbine, so that sulfur contained in a lubricating oil, depending on a nature of the oil and the temperature, tends to react with copper in the bearing metal so as to form copper sulfide (CuS), forming a blackened layer mainly composed of CuS on the surface of the bearing metal. This is known as the "blackening corrosion phenomenon". The blackened layer progressively grows as the bearing is used long and is exfoliated from the bearing surface to seriously impair the bearing function of the floating bush bearing.

Furthermore, the conventional bearing materials could not provide satisfactory seizure resistance under dry conditions, i.e., when the lubrication with lubricating oil is stopped at a high temperature such as 300° C. or higher. To explain in more detail, a turbocharger, which has a gas turbine impeller driven by energy of exhaust gas of high temperature and pressure and a compressor driven by the turbine impeller, has to idle due to its inertia even after the engine is stopped to terminate the supply of pressurized lubricating oil. Consequently, the turbocharger is obliged to idle awhile without cooling and lubricating effects produced by the lubricating oil. As a result, heat energy which has been accumulated in the turbine housing of high temperature is transmitted to regions of lower temperatures, thus raising the temperature of the bearing portion. Thus, the bearing is required to have a high resistance to seizure in dry state at high temperature.

Hitherto, lead-bronze systems containing copper, lead and tin as main components, and free cutting brass containing copper, zinc and lead as main components have been widely used as the material of the floating bush bearings of turbochargers. However, floating bush bearings of lead-bronze system alloy undesirably promote generation of blackened layer due to reaction between sulfur in the lubricating oil and copper in the bronze under dry-up condition at high temperature of 300° C. or so and allows a rapid wear of the bearing surface. On the other hand, the free cutting brass system alloys, although they exhibit superior corrosion resistance, exhibit inferior affinity for lubricating oil after termination of lubrication, thus allowing a comparatively early seizure or scuffing.

SUMMARY OF THE INVENTION

Accordingly, an object of the present invention is to provide a novel copper base alloy suitable for use as a material of a sliding member, which is superior in resistances to wear, seizure and corrosion and which well withstand use under severe conditions, i.e., operation at high sliding speed and high temperature in a highly-corrosive condition, as typically encountered by turbocharger bearings.

The above-described object of the present invention is achieved by one of the following alloys (a) to (d) of the present invention.

(a) A copper base alloy suitable for use as a material of a sliding member, superior in seizure resistance, wear resistance and corrosion resistance, the alloy comprising 1.0 to 3.5 wt % of manganese, 0.3 to 1.5 wt % of silicon, 11.5 to 25 wt % of zinc, 5 to 18 wt % of lead and the balance of the alloy being essentially copper and incidental impurities, the lead being uniformly distributed through the structure of the alloy, the alloy having a micro-structure of which its matrix is composed of $\alpha$-phase alone.

(b) A copper base alloy suitable for use as a material of a sliding member, superior in seizure resistance, wear resistance and corrosion resistance, the alloy comprising 1.0 to 3.5 wt % of manganese, 0.3 to 1.5 wt % of silicon, 11.5 to 25 wt % of zinc, 5 to 18 wt % of lead, at least one metal selected from the group consisting of 0.02 to 1.5 wt % of magnesium and 0.1 to 1.5 wt % of tellurium, and the balance of the alloy being essentially copper and incidental impurities, the lead being uniformly distributed through the structure of the alloy, the alloy having a micro-structure of which its matrix is composed of $\alpha$-phase alone.

(c) A copper base alloy suitable for use as a material of a sliding member, superior in seizure resistance, wear resistance and corrosion resistance, the alloy comprising 1.0 to 3.5 wt % of manganese, 0.3 to 1.5 wt % of silicon, 11.5 to 25 wt % of zinc, 5 to 18 wt % of lead, at least one metal selected from the group consisting of 0.5 to 3.0 wt % of nickel and 0.3 to 3.0 wt % of aluminum, and the balance of the alloy being essentially copper and incidental impurities, the lead being uniformly distributed through the structure of the alloy, the alloy having a micro-structure of which its matrix is composed of $\alpha$-phase alone.

(d) A copper base alloy suitable for use as a material of a sliding member, superior in seizure resistance, wear resistance and corrosion resistance, the alloy comprising 1.0 to 3.5 wt % of manganese, 0.3 to 1.5 wt % of silicon, 11.5 to 25 wt % of zinc, 5 to 18 wt % of lead, at least one metal selected from the group consisting of 0.02 to 1.5 wt % of magnesium and 0.1 to 1.5 wt % of tellurium, at least one metal selected from the group consisting of 0.5 to 3.0 wt % of nickel and 0.3 to 3.0 wt % of aluminum, and the balance of the alloy being essentially copper and incidental impurities, the lead being uniformly distributed through the structure of the alloy, the alloy having a micro-structure of which its matrix is composed of $\alpha$-phase alone.

A description will be given of the functions of the alloy elements and reasons of limitation of contents of these elements.

(1) Zinc (Zn): 11.5 to 25 wt %

Zinc is an element which provides high strength and wear resistance, as well as corrosion resistance to lubricating oil. The preferred content of this element depends on zinc equivalents of other elements but the content of this element should be not less than 11.5 wt % because the strength and wear resistance are not appreciable when the zinc content is below 10 wt % and corrosion resistance at high temperature, i.e. protection against so-called "blackening corrosion phenomenon", is not sufficiently effective when the zinc content is below 11.5%. Amount of addition of lead (Pb), which has been conventionally added to improve seizure resistance, is undesirably limited when the structure has a mixed phase of $\alpha$ and $\beta$. Therefore, as a rule, the alloy of the present invention has to be a single-phase structure of $\alpha$-phase. In order to insure a micro-structure of $\alpha$-phase alone and allow the presence of minimum content, e.g., 5 wt %, of lead in the $\alpha$-phase, the maximum content of zinc should be set to 25 wt %.

(2) Manganese (Mn): 1.0 to 3.5 wt %

Manganese reacts with silicon (Si) so as to form an intermetallic compound $Mn_5Si_3$ which is superior in sliding characteristic, thus contributing to improvement in wear resistance and seizure resistance, while preventing any plastic flow of the matrix in the event of a metal-to-metal contact. In order to obtain an appreciable effect, the manganese should be present in an amount of at least 1.0 wt %. Any manganese content exceeding 3.5 wt %, on the other hand, causes a saturation of the effect and, moreover, undesirably embrittles the alloy.

(3) Silicon (Si): 0.3 to 1.5 wt %

As stated before, silicon reacts with manganese so as to form the intermetallic compound $Mn_5Si_3$ which contribute to improvement in wear resistance and seizure resistance. The content of silicon is determined in accordance with the content of $Mn_5Si_3$ to be obtained. The whole silicon is changed into the above-mentioned compound when the ratio of the manganese content and the silicon is 1:0.3 in terms of weight ratio. Thus, the silicon content should be 0.3 wt % at the smallest. Addition of silicon in excess of the upper limit value of 1.5 wt % causes an excessive crystallization of free silicon, causing an embrittlement of the alloy.

(4) Lead (Pb): 5 to 18 wt %

Lead has a self-lubricating property and can easily be melted by friction heat so as to spread over the sliding surface to form a thin film of several microns thick, thus remarkably improving seizure resistance and attaining also a good machining property. In order to form the thin film of lead of several microns thick, it is necessary that the lead content be at least 5 wt %. An increase in the lead content, on the other hand, causes a reduction in the strength of the alloy, so that the maximum lead content is set to be 18 wt %. The lead content, therefore, is determined to range between 5 and 18 wt %.

(5) Magnesium (Mg): 0.02 to 1.5 wt %

Magnesium is an element which is effective in uniformly dispersing lead and also in strengthening the matrix. These effects are not appreciable when the magnesium content is below 0.02 wt %. Addition of magnesium in excess of 1.5 wt %, on the other hand, causes an excessive crystallization of intermetallic compound of magnesium and lead, thus impairing the lubricating effect which would be produced by lead. For these reasons, the content of magnesium is limited to range from 0.02 wt % to 1.5 wt %.

(6) Tellurium (Te): 0.1 to 1.5 wt %

Presence of a small amount of tellurium promotes uniform dispersion of lead and improves toughness and seizure resistance, as well as corrosion resistance, of the alloy. These effects, however, are not appreciable when the tellurium content is below 0.1 wt %. On the other hand, addition of tellurium in excess of 1.5 wt % causes a substantial saturation in the effect while raising the cost uneconomically. The amount of addition of tellurium, therefore, should be from 0.1 to 1.5 wt %.

(7) Nickel (Ni): 0.5 to 3.0 wt %

Nickel strengthens the matrix so as to improve the strength of the alloy while enhancing wear resistance. Nickel also raises the recrystallization temperature so as to prevent coarsening of the crystal grains during hot plastic working. These effects, however, are not noticeable when the nickel content is below 0.5 wt %. On the other hand, addition of nickel in excess of 3 wt % seriously impairs fatigue strength and impact resistance of the alloy. For these reasons, the nickel content is determined to range from 0.5 to 3.0 wt %.

(8) Aluminum (Al): 0.3 to 3.0 wt %

Aluminum also contributes to strengthening of the matrix. This effect, however, is not appreciable when the aluminum content is below 0.3 wt %. On the other hand, aluminum content exceeding 0.3 wt % undesirably causes embrittlement and coarsening of the crystal grains. For thee reasons, the aluminum content is determined to range from 0.3 to 3.0 wt %.

Several examples of the alloy of the present invention will be described hereinunder with reference to the drawings.

BRIEF DESCRIPTION OF THE DRAWINGS

FIG. 1 is a graph illustrating, in cooperation with Table 4, the procedure of a seizure resistance test;

FIG. 4 is a graph showing the results of a corrosion resistance test.

EXAMPLES

Test Example 1 (Alloy of The Present Invention)

Alloys of compositions Nos. 1 to 9 shown in Table 1 were prepared by continuous casting process and were formed into bars of 35 mm diameter through extrusion and drawing. The bars were suitably worked to provide test pieces for a seizure test, wear test and a corrosion test.

Figure 2:
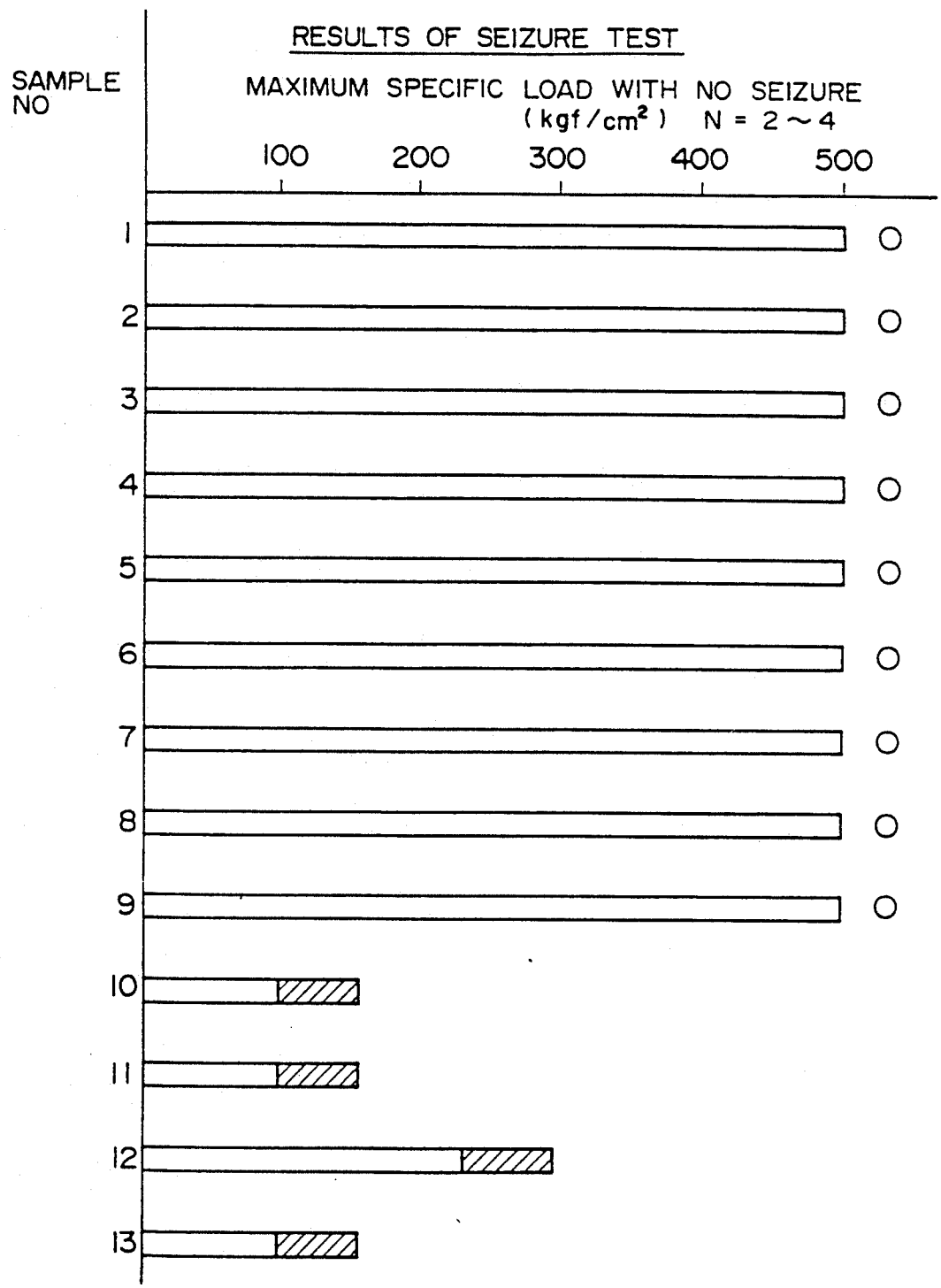
FIG. 2 is a graph illustrating the results of the seizure resistance test.

Conditions of the tests conducted on these test pieces were shown in Tables 2 to 4 and FIG. 1. The results of the seizure test and the wear test are shown in FIGS. 2 and 3 respectively. Representative data of the results of the corrosion test is shown in FIG. 4.

Test Example 2 (Conventional Alloy)

Figure 3:
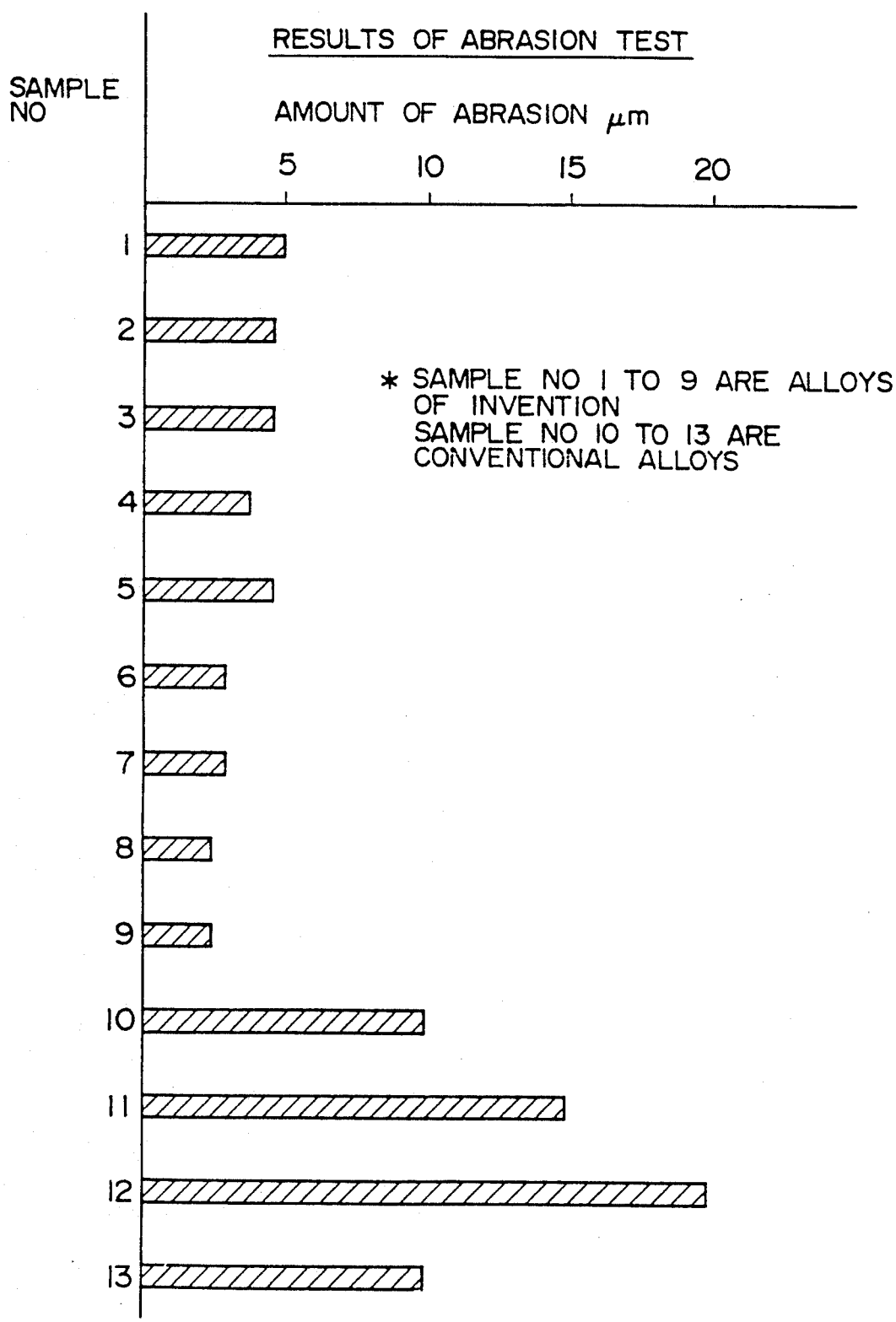
FIG. 3 is a graph showing the results of a wear resistance test.

Conventional alloys of compositions Nos. 10 to 13 shown in Table 1 were formed into bars of 35 mm diameter through continuous casting, extrusion and drawing. The thus obtained bars were subjected to the same tests as those for the test pieces of Test Example 1. Conditions of these tests are shown in Tables 2 to 4 and FIG. 1, while the test results are shown in FIGS. 2 to 4.

Although the tests were conducted on the bars of alloys which were produced through continuous casting, it is to be understood that the same advantages are obtained with test pieces of alloys formed by a different casting method, such as a stationary casting method.

TABLE 1

| Class | Sample No. | Composition (wt %) | | | | | | | | | | Mechanical Property | | |
|---|---|---|---|---|---|---|---|---|---|---|---|---|---|---|
| | | Cu | Zn | Pb | Mn | Si | Te | Mg | Al | Ni | Sn | Fe | Tensile Strength (Kgf/mm²) | Elongation (%) | Hardness (Hv10) |
| Alloy of The Present Invention | 1 | Bal. | 18 | 6 | 2.5 | 1.0 | | | | | | | 28.3 | 7.4 | 104 |
| | 2 | Bal. | 20 | 15 | 2.0 | 0.7 | | | | | | | 27.0 | 7.0 | 105 |
| | 3 | Bal. | 15 | 6 | 3.0 | 1.3 | 1.0 | | | | | | 29.0 | 9.0 | 110 |
| | 4 | Bal. | 23 | 13 | 2.0 | 1.0 | | 1.0 | | | | | 29.5 | 10.0 | 106 |
| | 5 | Bal. | 15 | 6 | 1.5 | 0.5 | | | | 1.0 | | | 32.0 | 9.0 | 115 |
| | 6 | Bal. | 18 | 15 | 2.0 | 1.0 | | | 1.0 | | | | 31.5 | 8.0 | 110 |
| | 7 | Bal. | 13 | 13 | 2.0 | 0.8 | 1.0 | | | 1.0 | | | 30.0 | 9.0 | 112 |
| | 8 | Bal. | 23 | 15 | 2.0 | 0.8 | 1.0 | | | 1.5 | 1.0 | | 34.0 | 10.0 | 110 |
| | 9 | Bal. | 18 | 6 | 1.5 | 0.5 | 1.0 | 1.0 | | 1.0 | 1.5 | | 37.0 | 11.0 | 125 |
| Conventional Alloy | 10 | 59 | Bal. | 3 | | | | | | | | | 41.3 | 32.2 | 128 |
| | 11 | Bal. | | 15 | | | | | | | 8 | | 29.3 | 12.6 | 87 |
| | 12 | 58 | Bal. | | 1.5 | | | | 1.0 | | | 0.5 | 61.0 | 27.0 | 140 |
| | 13 | Bal. | 34.1 | 4 | 3.0 | 1.2 | 0.4 | | 1.3 | | | | 55.0 | 25.0 | 151 |

TABLE 2

| Testing Condition | Abrasion test | |
|---|---|---|
| | Size | Unit |
| 1. Testing Machine | Bush Tester | |
| 2. Bush Size | φ20 × φ23 × L20 | mm |
| 3. Rotation Speed | 3,000 | rpm |
| 4. Circumferential Speed | 3.14 | m/s |
| 5. Surface Pressure (projected) | 10 | kgf/cm² |
| 6. Clearance (Diameter) | 0.08~0.10 | mm |
| 7. Lubricant | 10 | CC/min |
| 8. Temperature | 150 | °C. |
| 9. Shaft Material | JIS S55C | — |
| Roughness | 1.0 | Rmax μm |
| Hardness | 500~600 | Hv 10 kg |
| 10. Time | 100 | hour |

TABLE 3

| | Corrosion test Testing Condition |
|---|---|
| Oil | Immersing in Turbo Lubricating Oil (equivalent to 15 W-40) |
| Test Temperature | 130° C. |
| Test Time | 500 Hr, 1000 Hr |

TABLE 4

| Testing Condition | Seizure test | |
|---|---|---|
| | Size | Unit |
| 1. Testing Machine | Suzuki-type Tester | |
| 2. Bearing Size | φ25 × φ21.7 OD × ID | mm |
| 3. Rotation Speed | 1055 | rpm |

TABLE 4-continued

| Testing Condition | Seizure test | |
|---|---|---|
| | Size | Unit |
| 4. Circumferential Speed | 1.29 | m/s |
| 5. Lubricant | SAE 30 | — |
| 6. Lubricating Method | Oil Bath | — |
| 7. Lubricant Temperature | Room Temperature | °C. (at starting time) |
| 8. Shaft Material | JIS S55C | |
| Roughness | 0.3 | Rmax μm |
| Hardness | 500~600 | Hv 10 kg |

TABLE 5

Results of Test on Actual Turbocharger
Sample (Oil ON-OFF Test

| Class | No. | at Predetermined Speed) |
|---|---|---|
| Alloy of The Present Invention | 1 | 3000 cycle OK |
| | 2 | " |
| | 3 | " |
| | 4 | " |
| | 5 | " |
| | 6 | " |
| | 7 | " |
| | 8 | " |
| | 9 | " |
| Conventional Alloy | 10 | Seizure occurred in 2nd cycle |
| | 11 | Seizure occurred in 5th cycle |
| | 12 | Seizure occurred in 10th cycle |
| | 13 | Seizure occurred in 10th cycle |

Evaluation of Test results (1) From the comparison of the results of the seizure test shown in FIG. 2, it will be seen that the alloy of the present invention is usable without risk of seizure up to the maximum load of 500 kgf/cm², which should be contrasted to the conventional free cutting brass (No. 10) and high-strength brass (Nos. 12 and 13).

(2) The alloy of the present invention did not show any seizure in a seizure test at a given number of revolution in an actual machine incorporating a bearing made of the alloy in which the supply of lubricating oil to the machine was turned on and off, as shown in Table 5. Thus, the alloy of the present invention exhibits quite superior performance as a sliding material, thus offering a satisfactory result when used as the material of a floating bush bearing.

(3) As will be seen from FIG. 3 which shows the result of the wear test, the alloys produced in accordance with the present invention showed smaller amounts of wear than conventional alloys, thus providing superior wear resistance. The wear test was conducted by wet process using a lubricating oil, while employing a quench-hardened bearing made of JIS S55C as the mating (or opposed) sliding member.

(4) The alloys in accordance with the present invention also are superior in corrosion resistance than conventional alloys as will be seen from FIG. 4 showing the results of the corrosion test.

Thus, the copper base alloy of the prevent invention is superior in seizure resistance, wear resistance, corrosion resistance and familiarity as compared with conventional alloys, and these characteristics offer remarkable advantages particularly when the alloy of the present invention is used as a material of a sliding member which is required to have an improved performance and life, such as a sliding member of a turbocharger.

What is claimed is:

1. A copper base alloy suitable for use as a material of a sliding member, superior in seizure resistance, wear resistance and corrosion resistance, the alloy consisting of 1.0 to 3.5 wt % of manganese, 0.3 to 1.5 wt % of silicon, 11.5 to 25 wt % of zinc, 5 to 18 wt % of lead and the balance of the alloy being essentially copper and incidental impurities, the lead being uniformly distributed through the structure of the alloy, the alloy having a structure of which matrix is composed of α-phase alone.

2. A copper base alloy in accordance with claim 1 wherein the ratio of manganese to silicon is approximately 1:0.3 and wherein said manganese and silicon form an intermetallic compound $Mn_5Si_3$.

3. A copper base alloy suitable for use as a material of a sliding member, superior in seizure resistance, wear resistance and corrosion resistance, the alloy consisting essentially of 1.0 to 3.5 wt % of manganese, 0.3 to 1.5 wt % of silicon, 11.5 to 25 wt % of zinc, 5 to 18 wt % of lead, at least one selected from the group consisting of 0.02 to 1.5 wt % of magnesium and 0.1 to 1.5 wt % of tellurium and the balance of the alloy being essentially copper and incidental impurities, the lead being uniformly distributed through the structure of the alloy, the alloy having a structure of which matrix is composed of α-phase alone.

4. A copper base alloy suitable for use as a material of a sliding member, superior in seizure resistance, wear resistance and corrosion resistance, the alloy consisting essentially of 1.0 to 3.5 wt % of manganese, 0.3 to 1.5 wt % of silicon, 11.5 to 25 wt % of zinc, 5 to 18 wt % of lead, at least one selected from the group consisting of 0.5 to 3.0 wt % of nickel and 0.3 to 3.0 wt % of aluminum and the balance of the alloy being essentially copper and incidental impurities, the lead being uniformly distributed through the structure of the alloy, the alloy having a structure of which matrix is composed of α-phase alone.

5. A copper base alloy suitable for use as a material of a sliding member, superior in seizure resistance, wear resistance and corrosion resistance, the alloy consisting essentially of 1.0 to 3.5 wt % of manganese, 0.3 to 1.5 wt % of silicon, 11.5 to 25 wt % of zinc, 5 to 18 wt % of lead, at least one selected from the group consisting of 0.02 to 1.5 wt % of magnesium and 0.1 to 1.5 wt % of tellurium, at least one selected from the group consisting of 0.5 to 3.0 wt % of nickel and 0.3 to 3.0 wt % of aluminum and the balance of the alloy being essentially copper and incidental impurities, the lead being uniformly distributed through the structure of the alloy, the alloy having a structure of which matrix is composed of α-phase alone.

* * * * *